(12) United States Patent
Nakamura et al.

(10) Patent No.: US 6,643,911 B2
(45) Date of Patent: Nov. 11, 2003

(54) METHOD OF MANUFACTURING YOKE THROUGH MULTISTAGE-DRAWING PROCESS

(75) Inventors: Kouichi Nakamura, Toyohashi (JP);
Kazunobu Kanno, Toyohashi (JP);
Shinsuke Muroi, Hamamatsu (JP);
Tsuyoshi Kuribayashi, Toyohashi (JP);
Taketo Shimoda, Toyohashi (JP)

(73) Assignee: Asmo, Co., Ltd., Shizuoka (JP)

( * ) Notice: Subject to any disclaimer, the term of this patent is extended or adjusted under 35 U.S.C. 154(b) by 90 days.

(21) Appl. No.: 09/946,563

(22) Filed: Sep. 6, 2001

(65) Prior Publication Data

US 2002/0047423 A1 Apr. 25, 2002

(30) Foreign Application Priority Data

Sep. 13, 2000 (JP) ........................................ 2000-278262

(51) Int. Cl.[7] ......................... H02K 15/00; B23P 17/00; B21D 47/00
(52) U.S. Cl. ......................... 29/596; 29/421.1; 29/897; 310/154.12
(58) Field of Search ................................ 29/596, 421.1, 29/897, DIG. 11; 72/348, 349; 310/154.12

(56) References Cited

U.S. PATENT DOCUMENTS 5,845,394 A * 12/1998 Abe et al. .................. 29/897.2
6,191,516 B1 * 2/2001 Froehlich et al. ...... 310/156.08

FOREIGN PATENT DOCUMENTS

WO    WO 99/44273    9/1999

* cited by examiner

*Primary Examiner*—Carl J. Arbes
*Assistant Examiner*—Tim Phan
(74) *Attorney, Agent, or Firm*—Posz & Bethards, PLC

(57) ABSTRACT

A plate material is drawn to form a first-drawing product in the shape of an elliptically cylindrical container having an elliptical cross section. Then, the first-drawing product is drawn to form a re-drawing product in the shape of a generally circular cylindrical container. Next, the re-drawing product is drawn to form a late-drawing product in the shape of an elliptically cylindrical container having an elliptical cross section in which a major axis and a minor axis of the elliptical cross section are reversed with respect to a major axis and a minor axis of the elliptical cross section of the first-drawing product. Thereafter, the late-drawing product is drawn to form a final product as a yoke.

8 Claims, 11 Drawing Sheets

METHOD OF MANUFACTURING YOKE THROUGH MULTISTAGE-DRAWING PROCESS

CROSS REFERENCE TO RELATED APPLICATION

This application is based on and incorporates herein by reference Japanese Patent Application No. 2000-278262 filed on Sep. 13, 2000 and Japanese Patent Application No. 2001-224989 filed on Jul. 25, 2001.

BACKGROUND OF THE INVENTION

1. Field of the Invention

The present invention relates to a method of manufacturing a yoke of an electric motor.

2. Description of Related Art

Figure 12A:
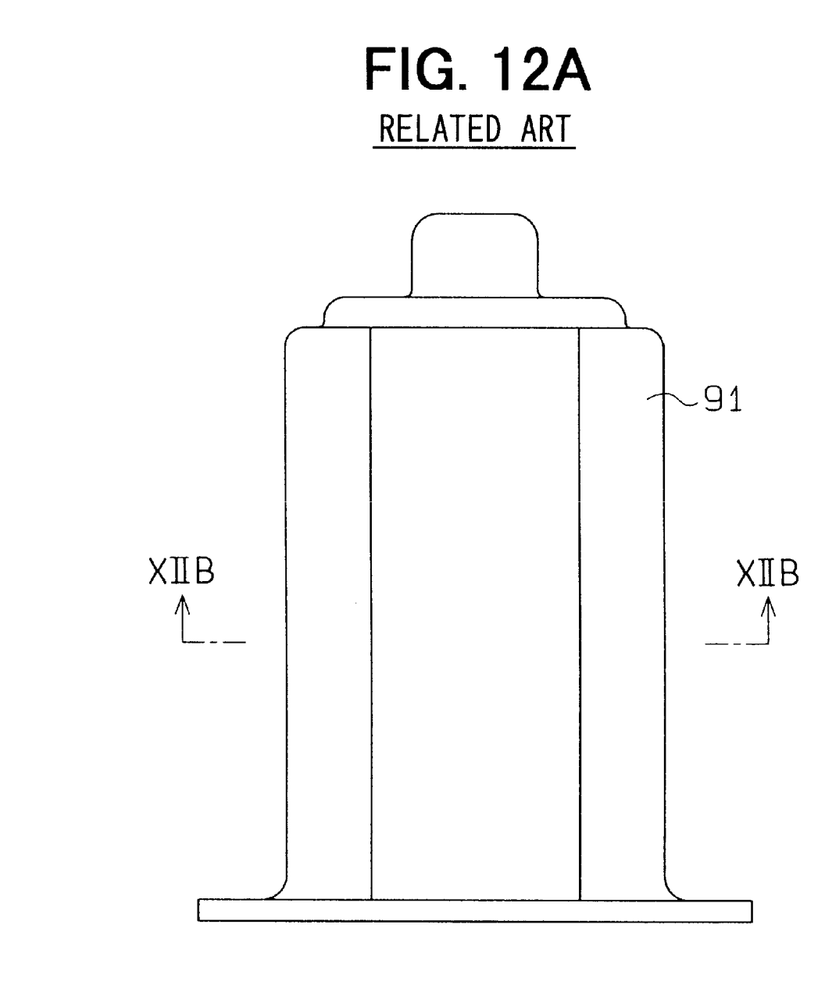
FIG. 12A is a side view of a yoke of a previously proposed electric motor.
Figure 12B:
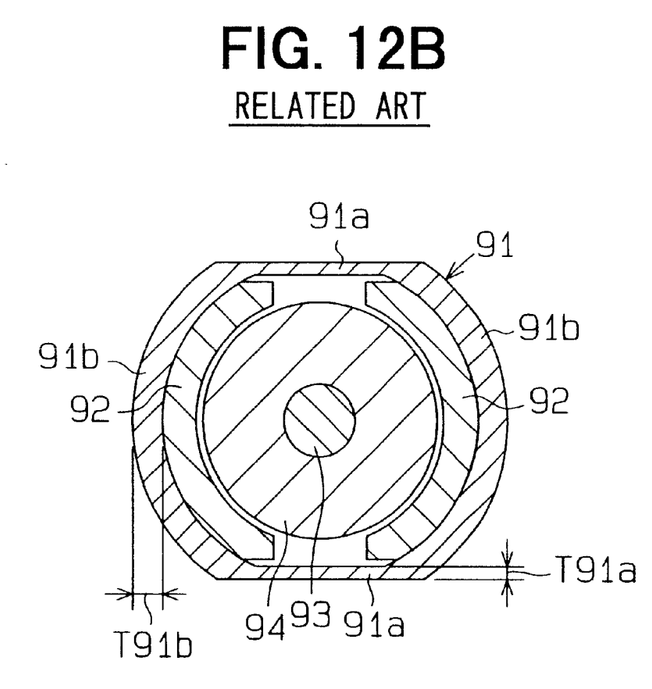
FIG. 12B is a cross sectional view along line XIIB—XIIB in FIG. 12A.

As shown in FIGS. 12A and 12B, a previously proposed electric motor typically includes a yoke 91, a pair of magnets 92, a rotatable shaft 93, and an armature 94.

The yoke 91 is formed as a flat cylindrical container. That is, the yoke 91 has two opposite flat portions 91a in parallel with each other in a cross section perpendicular to a central axis of the yoke 91 (i.e., a cross section shown in FIG. 12B), curved portions 91b that connect both the flat portions 91a together. Each of the magnets 92 is fixed on the inside of the corresponding curved portion 91b of the yoke 91. The rotatable shaft 93 is held in the inside of the yoke 91 such that the rotatable shaft 93 can rotate. Furthermore, the armature 94 is coaxially fixed on the rotatable shaft 93 such that the surface of the armature 94 faces the magnets 92.

As shown in FIGS. 13A to 16B, for example, such a yoke 91 can be fabricated by a method in which a metal plate is drawn into a predetermined form by performing a multistage-drawing process.

Figure 13A:
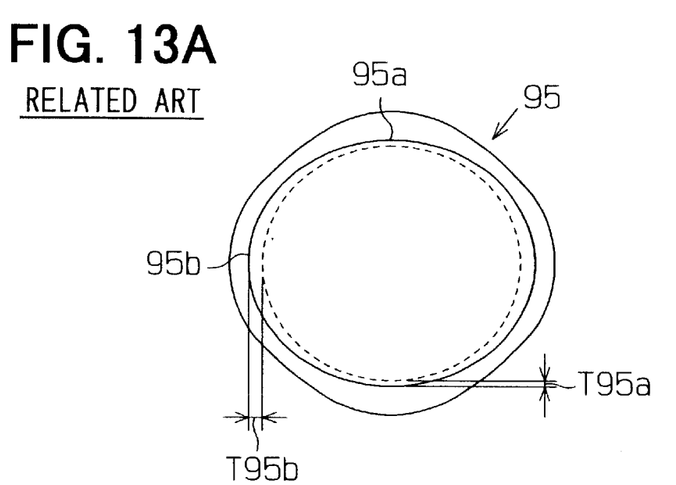
FIG. 13A is a plan view of a previously proposed first-drawing product.
Figure 13B:
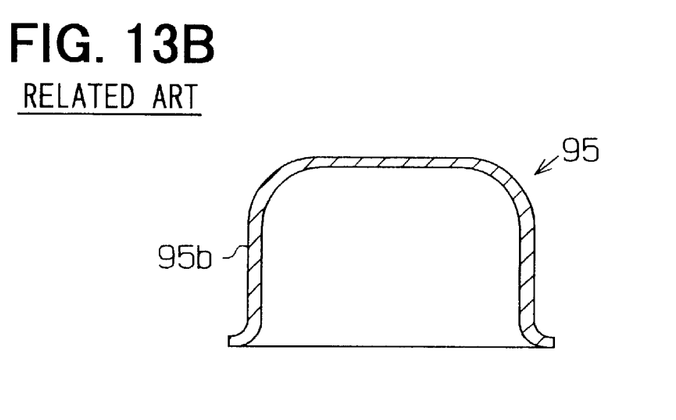
FIG. 13B is a cross sectional view of the previously proposed first-drawing product shown in FIG. 13A.
Figure 14A:
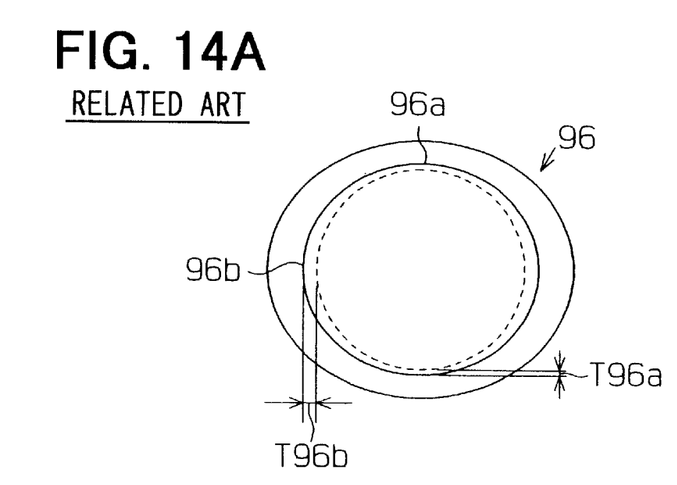
FIG. 14A is a plan view of a previously proposed re-drawing product.
Figure 14B:
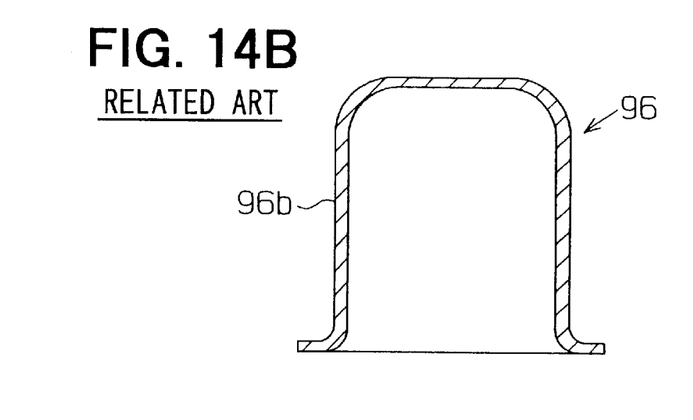
FIG. 14B is a cross sectional view of the previously proposed re-drawing product shown in FIG. 14A.

In other words, as shown in FIGS. 13A and 13B, the metal plate (not shown) is drawn into a first-drawing product 95 in the shape of an elliptically cylindrical container at an initial drawing stage of the multistage-drawing process. Here, the term "elliptically cylindrical container" represents a cylindrical tube with a bottom in which an opening (i.e., an inner side) thereof has an elliptical cross section in a radial direction perpendicular to an axis of the product 95. In addition, such an elliptical cross section will be simply described as "an elliptical shape" in the following description. As shown in FIGS. 14A and 14B, subsequently, the first-drawing product 95 is further drawn into a re-drawing product 96 at a middle drawing stage of the multistage-drawing process. The re-drawing product 96 has a depth greater than that of the first-drawing product 95. Also, an external periphery of the elliptical shape of the re-drawing product 96 is smaller than that of the first-drawing product 95.

Figure 15A:
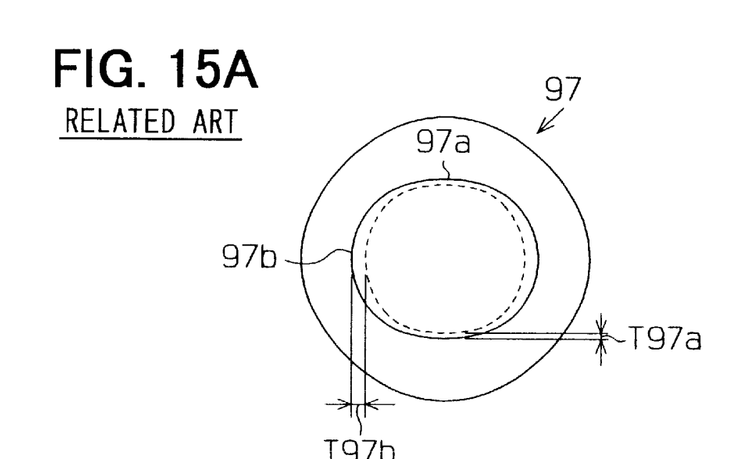
FIG. 15A is a plan view of a previously proposed second re-drawing product.
Figure 15B:
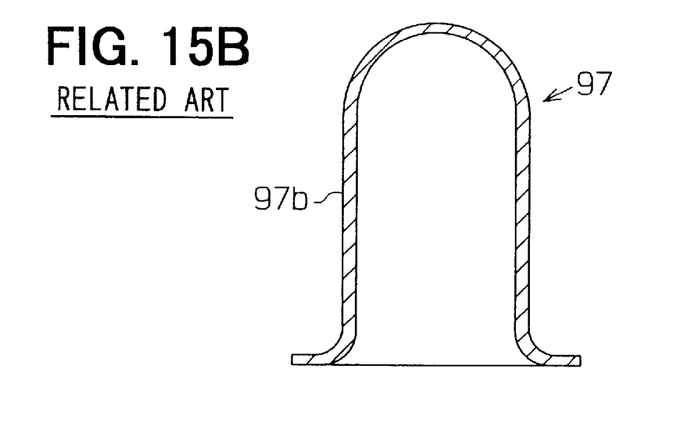
FIG. 15B is a cross sectional view of the previously proposed second re-drawing product shown in FIG. 15A.
Figure 16A:
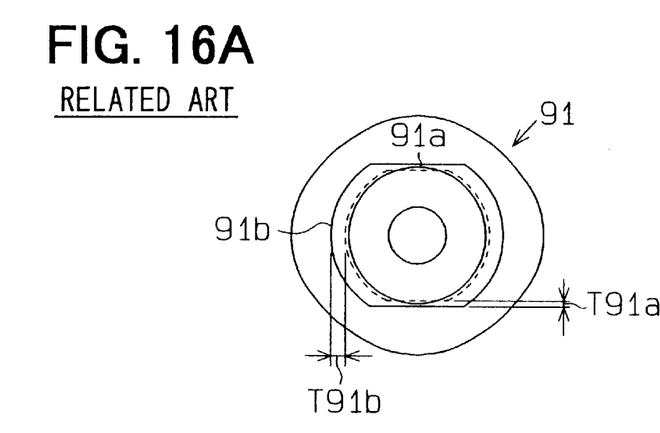
FIG. 16A is a plan view of a previously proposed yoke.
Figure 16B:
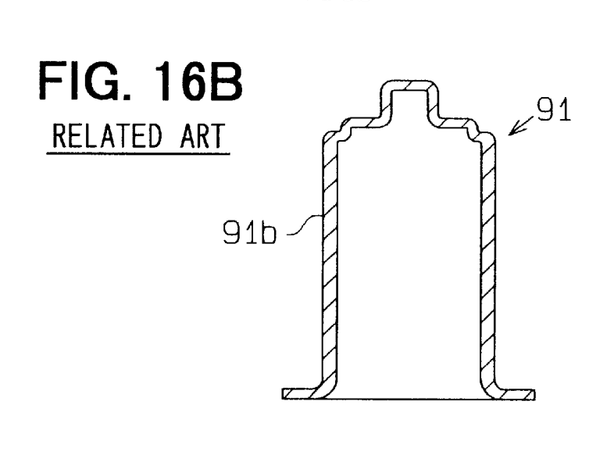
FIG. 16B is a cross sectional view of the previously proposed yoke shown in FIG. 16A.

Next, as shown in FIGS. 15A and 15B, the re-drawing product 96 is further drawn into a second re-drawing product 97 at a late stage of the multistage-drawing process. The second re-drawing product 97 has a depth greater than or equal to that of the re-drawing product 96. Also, an external periphery of the elliptical shape of the second re-drawing product 97 is smaller than that of the re-drawing product 96. As shown in FIGS. 16A and 16B, furthermore, the second re-drawing product 97 is drawn into the yoke 91 at a final stage of the multistage-drawing process. In this case, an arc segment 97a with a small amount of curvature of the elliptical shape of the second re-drawing product 97 is provided as the flat portion 91a while another arc segment 97b with a large amount of curvature is provided as the curved portion 91b.

However, as described above, the conventional method of manufacturing the yoke 91 by sequentially deforming into the desired shape thereof has the following disadvantages. In each stage of the multistage-drawing process, a thickness T95a–T97a of each arc segment 95a–97a having a small amount of curvature of the elliptical shape is thinner than a thickness T95b–T97b of the corresponding arc segment 95b–97b having a large amount of curvature. Thus, a thickness T91a of the flat portion 91a of the yoke 91 is thinner than a bard thickness T91b of the curved portion 91b.

Therefore, the thickness T91b of the curved portion 91b on which the magnet 92 is fixed is more than necessary even though it is a small effective part as a magnetic circuit, so that the amount of wasted part of the material increases. In addition, the thickness T91a is decreased even though the flat portion 91a is the most effective portion as a magnetic circuit. As a result, the amount of magnetic reluctance increases while the output of the motor (i.e., a torque performance of the motor) decreases.

SUMMARY OF THE INVENTION

The present invention addresses the above disadvantages, and it is an objective of the present invention to provide a method of manufacturing a yoke by performing a multistage-drawing process, which allows a reduction in the amount of a material waste of the yoke while contributing a high torque performance of an electric motor.

To achieve the objective of the present invention, there is provided a method of manufacturing a yoke by drawing a plate material into a final product as the yoke by performing a multistage-drawing process, where the final product as the yoke is in the shape of a cylindrical container having a couple of flat portions parallel to each other in a cross section perpendicular to a central axis of the final product and a couple of curved portions that connect the flat portions together. The method includes steps of drawing the plate material into a first-drawing product in the shape of an elliptically cylindrical container at an initial drawing stage, the first-drawing product including an elliptical cross section having a major axial length measured along a major axis of the elliptical cross section and a minor axial length measured along a minor axis of the elliptical cross section; drawing the first-drawing product obtained at the initial drawing stage into a re-drawing product in the shape of a generally circular cylindrical container at a middle drawing stage; drawing the re-drawing product obtained at the middle drawing stage into a late-drawing product in the shape of an elliptically cylindrical container at a late drawing stage, the late-drawing product including an elliptical cross section having a major axial length measured along a major axis of the elliptical cross section and a minor axial length measured along a minor axis of the elliptical cross section, the major axis and the minor axis of the elliptical cross section of the late drawing product obtained at the late drawing stage being reversed with respect to the major axis and the minor axis of the elliptical cross section of the first-drawing product obtained at the initial drawing stage, the late-drawing product having a couple of opposed smaller-curvature arc segments of a smaller curvature and a couple of opposed larger-curvature arc segments of a larger curvature; and drawing the late-drawing product obtained at the late drawing stage into the final product as the yoke at a final stage, such that the smaller-curvature arc segments of the late-drawing product are converted to the flat portions of the final product, respectively, and the larger-curvature arc segments of the late-drawing product are converted to the curved portions of the final product, respectively.

To achieve the objective of the present invention, there is also provided a method of manufacturing a yoke by drawing a plate material into a final product as the yoke by performing a multistage-drawing process, where the final product is in the shape of a cylindrical container. The method includes steps of clamping the plate material between a first presser plate and a first die and drawing the plate material into a first-drawing product using a first punch at an initial drawing stage, one of the first presser plate and the first die having two or more protrusions opposed to the other of the first presser plate and the first die, the first-drawing product being formed in the shape of an elliptically cylindrical container at the initial drawing stage, the first-drawing product including an elliptical cross section having a major axial length measured along a major axis of the elliptical cross section and a minor axial length measured along a minor axis of the elliptical cross section, at least two of the two or more protrusions being placed along the minor axis of the first-drawing product in opposed relationship to each other; and drawing the first-drawing product obtained at the initial drawing stage into the final product as the yoke at a final drawing stage, so that the final product is formed in the shape of the cylindrical container having an inner periphery in a generally circle form and an outer periphery in a generally ellipse form.

To achieve the objective of the present invention, there is also provided a method of manufacturing a yoke by drawing a plate material into a final product as the yoke by performing a multistage-drawing process, where the final product as the yoke is in the shape of a cylindrical container having a couple of flat portions parallel to each other in a cross section perpendicular to a central axis of the final product and a couple of curved portions that connect the flat portions together. The method includes steps of clamping the plate material between a first presser plate and a first die and drawing the plate material into a first-drawing product using a first punch at an initial drawing stage, one of the first presser plate and the first die having two or more protrusions opposed to the other of the first presser plate and the first die, the first-drawing product being formed in the shape of an elliptically cylindrical container at the initial drawing stage, the first-drawing product including an elliptical cross section having a major axial length measured along a major axis of the elliptical cross section and a minor axial length measured along a minor axis of the elliptical cross section, at least two of the two or more protrusions being placed along the minor axis of the first-drawing product in opposed relationship to each other; drawing the first-drawing product obtained at the initial drawing stage into a re-drawing product in the shape of a generally circular cylindrical container at a middle drawing stage; drawing the re-drawing product obtained at the middle drawing stage into a late-drawing product in the shape of an elliptically cylindrical container at a late drawing stage, the late-drawing product including an elliptical cross section having a major axial length measured along a major axis of the elliptical cross section and a minor axial length measured along a minor axis of the elliptical cross section, the major axis and the minor axis of the elliptical cross section of the late drawing product obtained at the late drawing stage being reversed with respect to the major axis and the minor axis of the elliptical cross section of the first-drawing product obtained at the initial drawing stage, the late-drawing product having a couple of opposed smaller-curvature arc segments of a smaller curvature and a couple of opposed larger-curvature arc segments of a larger curvature; and drawing the late-drawing product obtained at the late drawing stage into the final product as the yoke at a final stage, such that the smaller-curvature arc segments of the late-drawing product are converted to the flat portions of the final product, respectively, and the larger-curvature arc segments of the late-drawing product are converted to the curved portions of the final product, respectively.

To achieve the objective of the present invention, there is also provided a method of manufacturing a yoke by drawing a plate material into a final product as the yoke by performing a multistage-drawing process, where the final product is in the shape of a cylindrical container. The method includes steps of drawing the plate material into a first-drawing product in the shape of an elliptically cylindrical container at an initial drawing stage, the first-drawing product including an elliptical cross section having a major axial length measured along a major axis of the elliptical cross section and a minor axial length measured along a minor axis of the elliptical cross section; and drawing one of the first-drawing product obtained at the initial drawing stage and a subsequent product formed from the first-drawing product into the final product as the yoke at a final drawing stage, so that the final product is formed in the shape of the cylindrical container having an inner periphery in a generally circle form and an outer periphery in a generally ellipse form. At least one of the drawing steps further includes a step of drawing the plate material or any one of the products other than the final product by clamping the same between a second die and a second presser plate and then drawing the plate material or the any one of the products other than the final product by a second punch. Two or more first portions of an inner peripheral edge of the second die, which are arranged to be placed over corresponding positions that are on the minor axis of the first-drawing product, form first curve portions. Two or more second portions of the inner peripheral edge of the second die, which are arranged to be placed over corresponding positions that are on the major axis of the first-drawing product, form second curve portions. A curvature of each second curve portion is smaller than a curvature of each first curve portion.

To achieve the objective of the present invention, there is also provided a method of manufacturing a yoke by drawing a plate material into a final product as the yoke by performing a multistage-drawing process, where the final product is in the shape of a cylindrical container. The method includes steps of clamping the plate material between a first presser plate and a first die and drawing the plate material into a first-drawing product using a first punch at an initial drawing stage, one of the first presser plate and the first die having two or more protrusions opposed to the other of the first presser plate and the first die, the first-drawing product being formed in the shape of an elliptically cylindrical container at the initial drawing stage, the first-drawing product including an elliptical cross section having a major axial length measured along a major axis of the elliptical cross section and a minor axial length measured along a minor axis of the elliptical cross section, at least two of the two or more protrusions being placed along the minor axis of the first-drawing product in opposed relationship to each other; and drawing the first-drawing product obtained at the initial drawing stage into the final product as the yoke at a final drawing stage, so that the final product is formed in the shape of the cylindrical container having an inner periphery in a generally ellipse form and an outer periphery in a generally circle form.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.

(First Embodiment)

Figure 1A:
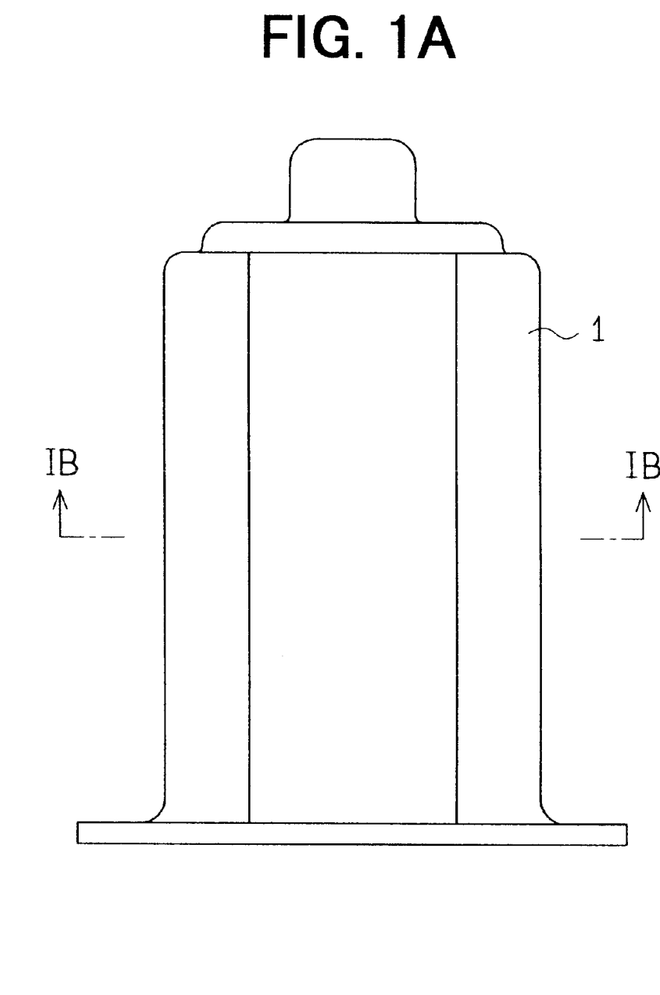
FIG. 1A is a side view of a yoke of an electric motor according to a first embodiment of the present invention.
Figure 1B:
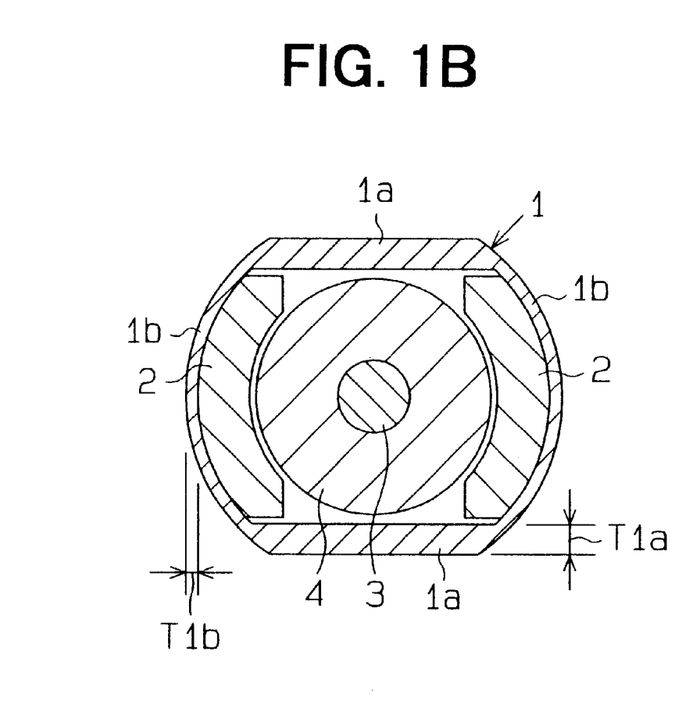
FIG. 1B is a cross sectional view taken along line IB—IB in FIG. 1A.

Hereinafter, a first embodiment of the present invention will be described with reference to FIGS. 1A to 5B. As shown in FIGS. 1A and 1B, a flat type electric motor includes a yoke 1, a pair of magnets 2, a rotatable shaft 3 and an armature 4.

The yoke 1 is shaped like a flat cylindrical container. In other words, the yoke 1 has two opposite flat portions 1a in parallel with each other in a cross section perpendicular to a central axis and curved portions 1b connected to both the flat portions 1a. A thickness T1a of each flat portion 1a is greater than a thickness T1b of each curved portion 1b.

Each of the magnets 2 is fixed on the inside of the corresponding curved portion 1b. The rotatable shaft 3 is held in the inside of the yoke 1 in a rotatable manner. In addition, the armature 4 is coaxially fixed on the rotatable shaft 3 so as to be faced to the magnets 2.

Referring now to FIGS. 2A to 5B, a method of manufacturing the yoke 1 will be described. The yoke 1 is fabricated from a metal plate by performing a multistage-drawing process that includes several different drawing stages.

Figure 2A:
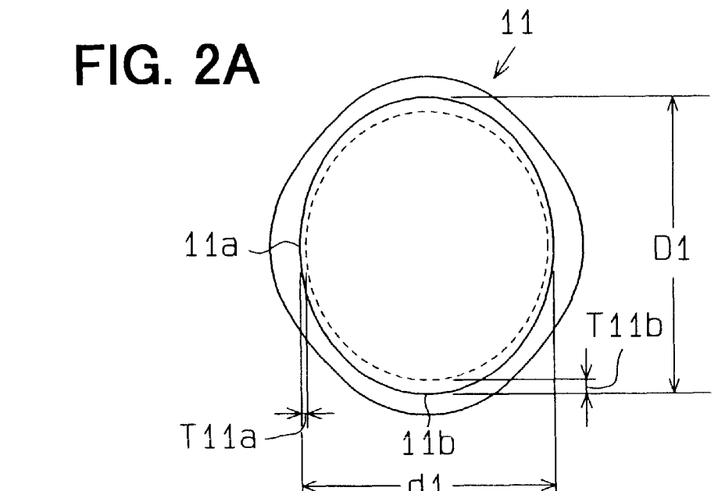
FIG. 2A is a plan view of a first-drawing product in the first embodiment of the present invention.
Figure 2B:
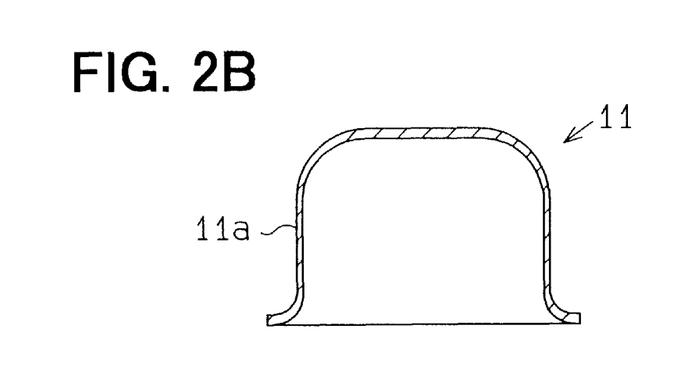
FIG. 2B is a cross sectional view of the first-drawing product shown in FIG. 2A.

In detail, as shown in FIGS. 2A and 2B, the metal plate (not shown) as a starting material is drawn into a first-drawing product 11 in the shape of an elliptically cylindrical container at an initial drawing stage of a multistage-drawing process. In each arc segment 11a with a smaller amount of curvature of an elliptical shape (hereinafter, simply referred to as a smaller-curvature arc segment), a degree of contraction in a circumferential direction is comparatively small. Thus, a thickness T11a of the smaller-curvature arc segment 11a becomes thinner than a thickness T11b of an arc segment 11b with a larger amount of curvature (hereinafter, simply referred to as a larger-curvature arc segment).

Figure 3A:
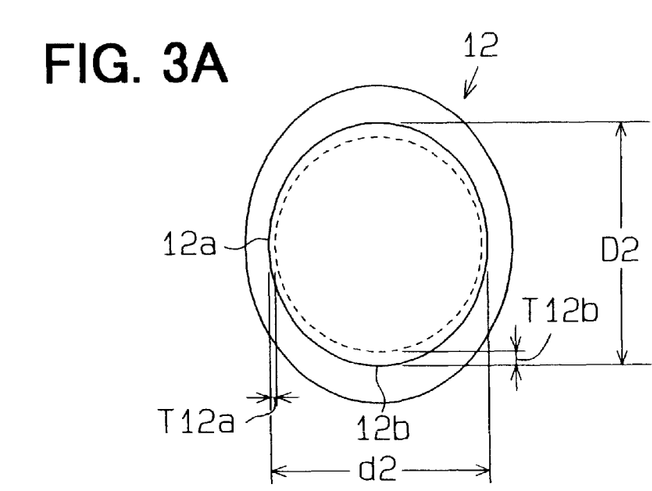
FIG. 3A is a plan view of a re-drawing product obtained in the first embodiment of the present invention.
Figure 3B:
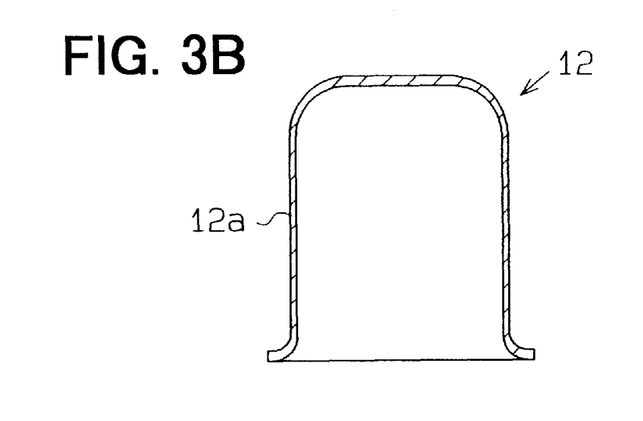
FIG. 3B is a cross sectional view of the re-drawing product shown in FIG. 3A.

Next, as shown in FIGS. 3A and 3B, the first-drawing product 11 is further drawn into a re-drawing product 12 in the shape of a cylindrical container where a cross section of the inside thereof is a generally perfect circle. In this case, a depth of the re-drawing product 12 is greater than that of the first-drawing product 11. A thickness T12b of an arc segment 12b that corresponds to the larger-curvature arc segment 11b becomes thicker than a thickness T12a of an arc segment 12a that corresponds to the smaller-curvature arc segment 11a. In this embodiment, the drawing is performed so that a major axial length D1 measured along a major axis of the ellipse shape of the first-drawing product 11 largely decreases while a minor axial length d1 measured along a minor axis of the ellipse shape of the first-drawing product 11 slightly decreases. In this embodiment, therefore, the thickness T12b of the arc segment 12b that corresponds to the larger-curvature arc segment 11b is kept substantially equal to the thickness T11b of the arc segment 11b.

Figure 4A:
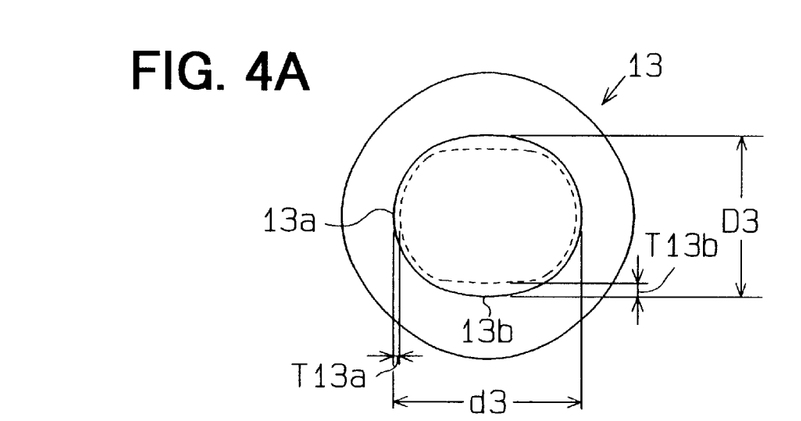
FIG. 4A is a plan view of a second re-drawing product obtained in the first embodiment of the present invention.
Figure 4B:
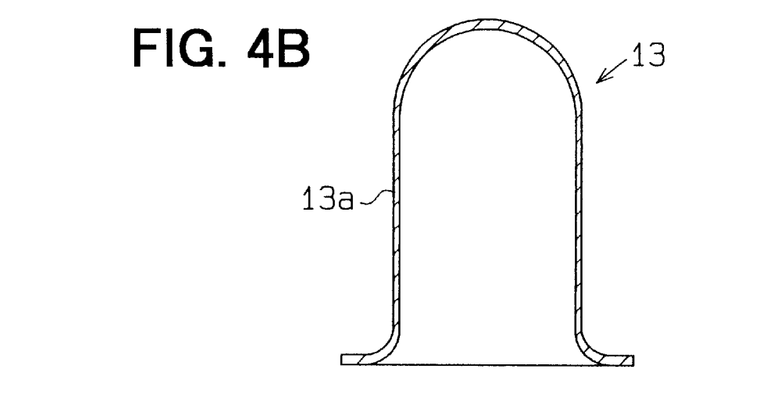
FIG. 4B is a cross sectional view of the second re-drawing product shown in FIG. 4A.

Furthermore, as shown in FIGS. 4A and 4B, the re-drawing product 12 is drawn into a second re-drawing product 13 at a late stage of the multistage-drawing process. The resulting product 13 is formed in the shape of an elliptically cylindrical container. A depth of the second re-drawing product 13 is greater than or equal to that of the re-drawing product 12. In this case, a relationship between the smaller-curvature arc segment 11a and the larger-curvature arc segment 11b of the first-drawing product 11 is reversed (i.e., the major axis and the minor axis of the ellipse are reversed). That is, the drawing is performed so that the arc segment 12a of the re-drawing product 12 that corresponds to the smaller-curvature arc segment 11a becomes a larger-curvature arc segment 13a while the arc segment 12b that corresponds to the larger-curvature arc segment 11b becomes a smaller-curvature arc segment 13b. As a result, a thickness T13b of the smaller-curvature arc segment 13b becomes thicker than a thickness T13a of the larger-curvature arc segment 13a. In the present embodiment, the drawing is performed so that a minor axial length D3 thereof largely decreases with respect to the diameter D2 of the re-drawing product 12 in a measurement direction of the major axial length D1 while a major axial length d3 slightly decreases with respect to a length d2 of the re-drawing product 12 in a measurement direction of the minor axial length d1. In other words, the drawing is performed so that the major axial length D1 of the first-drawing product 11 largely decreases while the minor axial length d1 of the first-drawing product 11 slightly decreases. In this embodiment, as a result, the thickness T13b of the smaller-curvature arc segment 13b becomes slightly larger than the thicknesses T11b, T12b and the thickness of the pre-drawing metal plate.

Figure 5A:
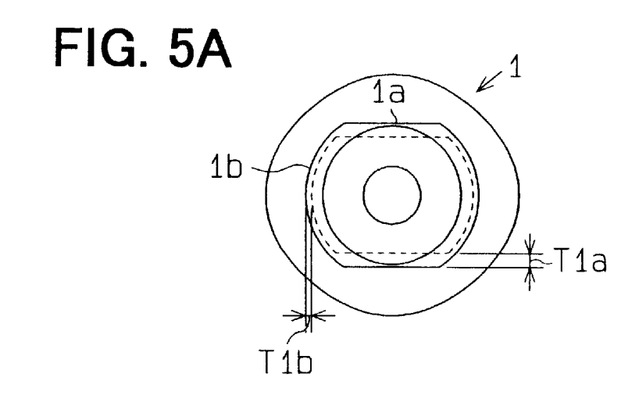
FIG. 5A is a plan view of a yoke in the first preferred embodiment of the present invention.
Figure 5B:
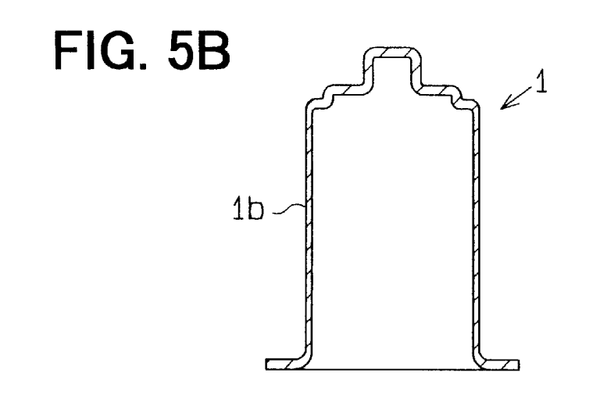
FIG. 5B is a cross sectional view of the yoke shown in FIG. 5A.

Next, as shown in FIGS. 5A and 5B, the second re-drawing product 13 is drawn into the yoke 1 at a final stage of the multistage-drawing process. In this case, the yoke 1 is produced so that each smaller-curvature arc segment 13b of the second re-drawing product 13 becomes the corresponding flat portion 1a while each larger-curvature arc segment 13a becomes the corresponding curved portion 1b. Therefore, the thickness T1a of the flat portion 1a of the yoke 1 becomes thicker than the thickness T1b of the curved portion 1b. In the present embodiment, furthermore, the thickness T1a of the flat portion 1a becomes slightly thicker than that of the pre-drawing metal plate.

In the present embodiment, the multistage-drawing process is described as one having four stages (i.e., initial, middle, late, and final stage). Actually, several drawings are performed in each stage to gradually deform the target product. However, it is not limited to such a configuration of the process, and it is possible to change the number of the stages in the drawing process and to modify each stage.

Advantages of the first embodiment will be described below.

(1) When the first-drawing product 11 is formed as the elliptically cylindrical container at the initial stage, the thickness T11a of the smaller-curvature arc segment 11a becomes thinner than the thickness T11b of the larger-curvature arc segment 11b due to the fact that the degree of contraction in the circumferential direction is smaller in the smaller-curvature arc segment 11a. Finally, the smaller-curvature arc segment 11a of the first-drawing product 11 becomes the curved portion 1b, and the larger-curvature segment 11b of the first-drawing product 11 becomes the flat portion 11a, so that the thickness T1a of the flat portion 1a becomes thicker than the thickness T1b of the curved portion 1b.

Consequently, the thickness T1a of the flat portion 1a, which is much influential as a magnetic circuit, becomes comparatively thick, so that its magnetic reluctance becomes smaller. Thus, it contributes to a high torque performance of the electric motor. Furthermore, the thickness T1b of the curved portion 1b, which can be comparatively thin because of its small influence on a magnetic circuit (the magnetic reluctance may be large), becomes comparatively small, so that the amount of wasted part of the material can be decreased. Therefore, the yoke 1 can be produced at a low cost and can be reduced in weight. Thus, the electric motor having the yoke 1 can be produced at a low cost, and it allows the reduction in weight and obtains a high torque performance.

(2) At the middle stage of the drawing process, the drawing process is performed so that the major axial length D1 of the first-drawing product 11 largely decreases while the minor axial length d1 of the first-drawing product 11 slightly decreases. In the re-drawing product 12, the thickness T11b of the first-drawing product 11 may be maintained or may be thickened in order to make the product into the shape of a generally perfect circle without substantially increasing the minor axial length d1 of the first-drawing product 11. In this embodiment, furthermore, the thickness T12b of the arc segment 12b that corresponds to the larger-curvature arc segment 11b is kept substantially equal to the thickness T11b.

(3) At the late stage of the drawing process, the drawing process is performed so that the major axial length D1 of the first-drawing product 11 largely decreases while the minor axial length d1 of the first-drawing product 11 slightly decreases. In the second re-drawing product 13, the thickness T11b of the first-drawing product 11 can be kept as it is or can be made thicker to obtain an elliptical shape in which the relationship between the major axis and the minor axis of the first-drawing product 11 is reversed without substantially increasing the minor axial length d1 of the first-drawing product 11. In the present embodiment, therefore, the thickness T13b of the smaller-curvature arc segment 13b becomes slightly thicker than each of the thickness T11b of the first drawing-product 11, the thickness T12b of the re-drawing product, and the thickness of the pre-drawing metal plate.

(Second Embodiment)

Figure 6A:
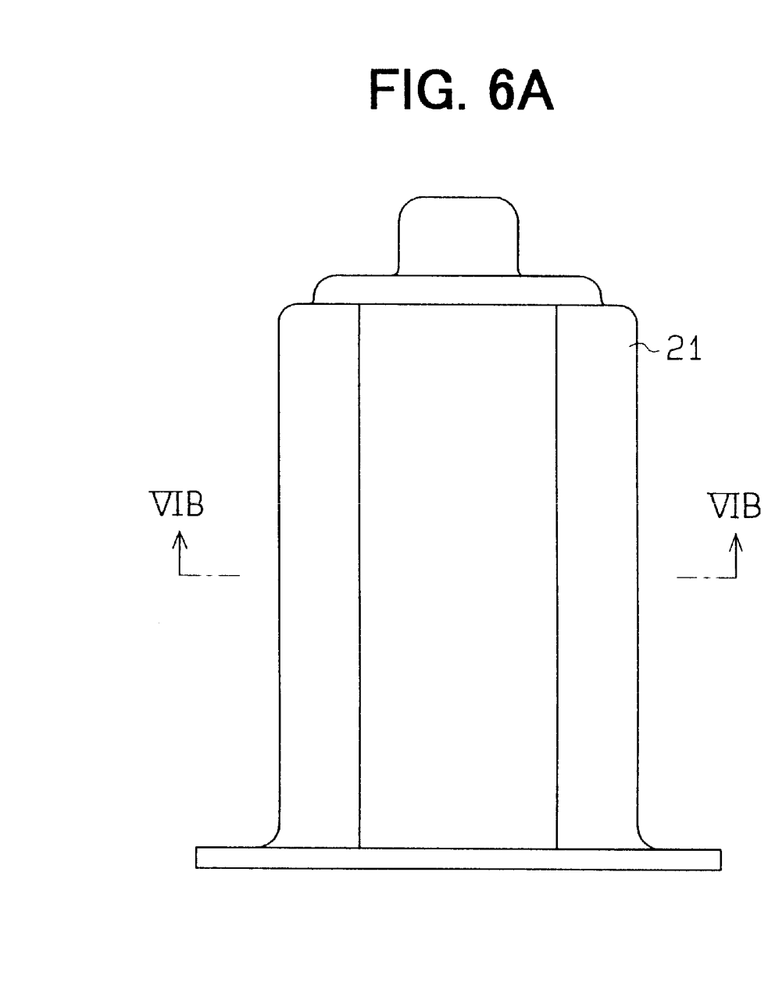
FIG. 6A is a side view of a yoke of an electric motor according to a second embodiment of the present invention.
Figure 6B:
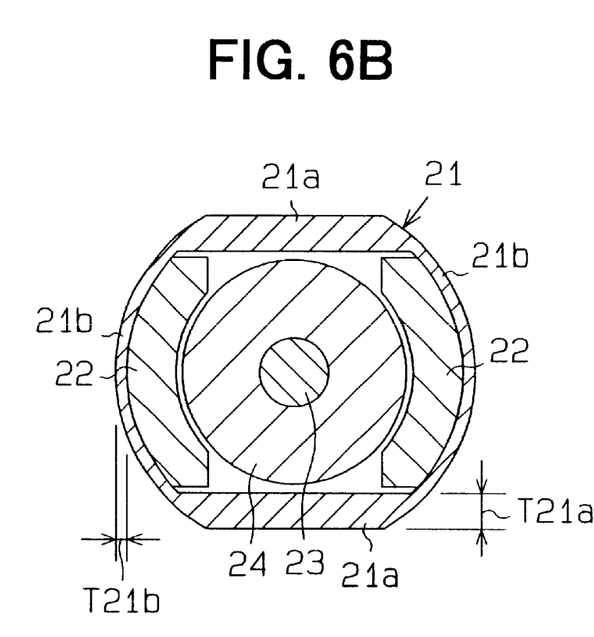
FIG. 6B is a cross sectional view taken along line VIB—VIB in FIG. 6A.

Hereinafter, a second embodiment of the present invention will be described with reference to FIGS. 6A to 10B. As shown in FIGS. 6A and 6B, a flat type electric motor includes a yoke 21, a pair of magnets 22, a rotatable shaft 23, and an armature 24.

The yoke 21 is shaped like a flat cylindrical container. In other words, the yoke 21 has two opposite flat portions 21a in parallel with each other in a cross section (i.e., the cross section shown in FIG. 6B) perpendicular to a central axis of the yoke 21 and curved portions 21b connected to both the flat portions 21a. A thickness T21a of the flat portion 21a is greater than a thickness T21b of the curved portion 21b. Furthermore, the difference between the thickness of the flat portion 21a and that of the curved portion 21b is greater than the difference between the thickness of the flat portion 1a and that of the curved portion 1b of the first embodiment.

Each of the magnets 22 is fixed on the inside of the corresponding curved portion 21b. The rotatable shaft 23 is held in the inside of the yoke 21 in a rotatable manner. In addition, the armature 24 is coaxially fixed on the rotatable shaft 23 so as to face to the magnets 22.

Referring now to FIGS. 7A to 10B, an apparatus for manufacturing the above yoke 21 will be described in detail.

The apparatus for manufacturing the yoke 21 includes a plurality of drawing devices that include first and second drawing devices 30 and 40.

Figure 7A:
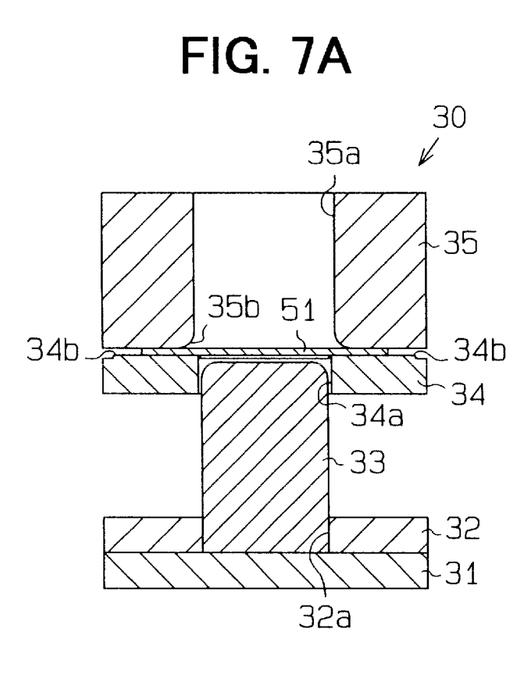
FIG. 7A is a cross sectional view of a first drawing device taken along a minor axis of an elliptically-shaped central opening of a die of the first drawing device in the second embodiment of the present invention.
Figure 7B:
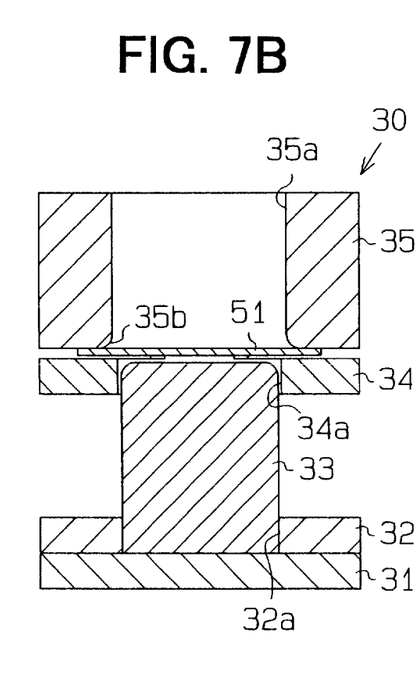
FIG. 7B is a cross sectional view of the first drawing device of FIG. 7A taken along a major axis of the elliptically-shaped central opening of the die of the device.

As shown in FIGS. 7A and 7B, the first drawing device 30 has a packing plate 31, a punch holder 32, a punch (first punch) 33, a presser plate (first presser plate) 34 and a die (first die) 35.

The packing plate 31 is formed in the shape of a generally circular plate. The punch holder 32 is fixed on the top of the packing plate 31. In addition, an elliptically shaped central opening 32a is formed in the center of the punch holder 32. In FIG. 7A, furthermore, there is shown a cross section of the central opening 32a of the punch holder 32 taken along a minor axis of the central opening 32a. In FIG. 7B, on the other hand, there is shown a cross section of the central opening 32a of the punch holder 32 taken along a major axis of the central opening 32a. The punch 33 is formed like a bar in the shape of an ellipse in its radial cross section so as to correspond to the elliptically-shaped central opening 32a. The punch 33 is introduced into the central opening 32a of the punch holder 32 until the bottom end of the punch 33 touches the top surface of the packing plate 31.

Figure 7C:
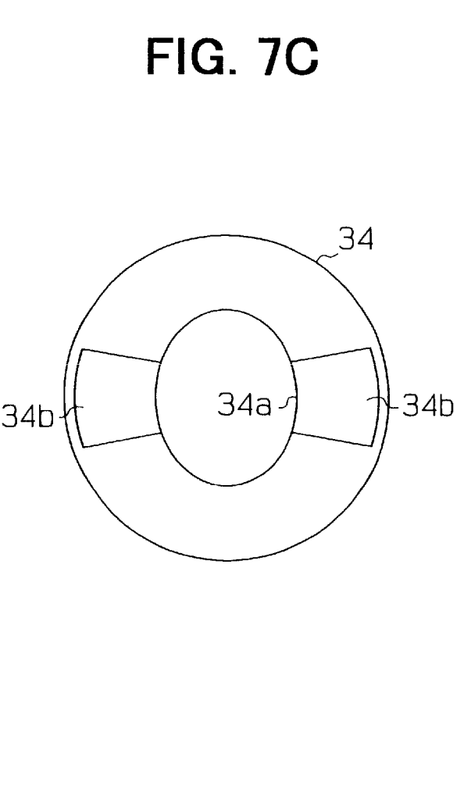
FIG. 7C is a plan view showing a presser plate in the second embodiment.

The presser plate 34 is placed above the punch holder 32. In the center of the presser plate 34, an elliptically-shaped central opening 34a is formed such that it is slightly larger than the central opening 32a of the punch holder 32. In addition, upward protrusions 34b are formed on the top of the presser plate 34. As shown in FIG. 7C, the protrusions 34b are formed such that the protrusions 34b are positioned symmetrically with respect to a center point of the presser plate 34 and extend in a direction of a minor axis of the elliptically-shaped central opening 34a of the presser plate 34. In addition, the protrusions 34b of the present embodiment are generally formed as a fan shape.

The die 35 is arranged above the presser plate 34. The die 35 is generally formed in the shape of a cylinder. A central opening 35a of the die 35 is formed in the shape of an ellipse in its radial cross section and is larger than the central opening 32a of the punch holder 32 for a predetermined amount. In other words, such a configuration of the central opening 35a of the die 35 allows insertion of the punch 33 therein in such a manner that a predetermined clearance is formed between the die 35 and the punch 33. In addition, there is a curved surface portion 35b formed on a bottom end of the central opening 35a of the die 35 (an inner peripheral edge on the bottom of the die 35). The curved surface portion 35b is gradually extended toward the bottom end.

Furthermore, the packing plate 31, the punch holder 32 and the punch 33 are assembled together. Then, such an assembly and the die 35 are arranged so as to allow their relative displacements with respect to the presser plate 34 in upward and downward directions by means of a driving device (not shown) connected thereto.

Figure 10A:
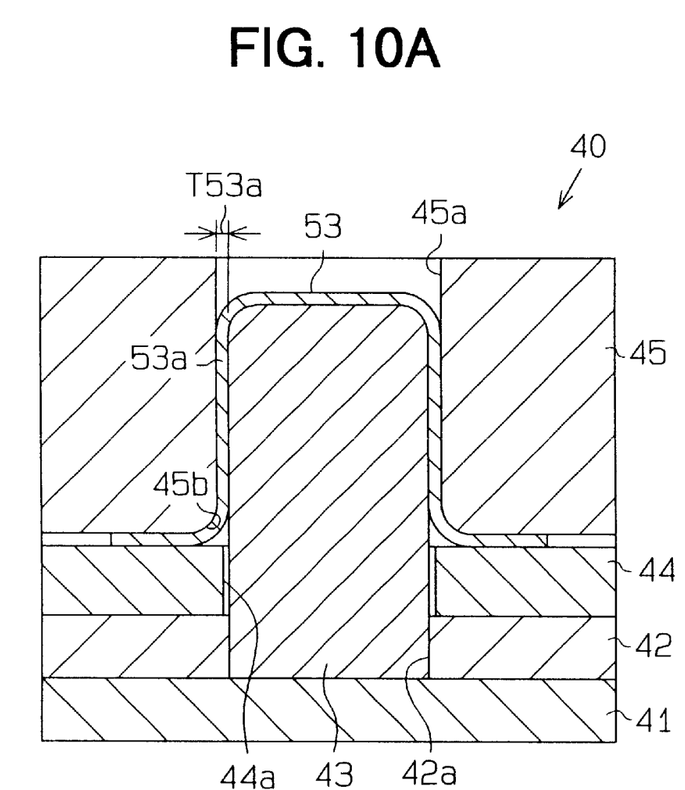
FIG. 10A is a cross sectional view for illustrating the method of manufacturing the yoke in accordance with the second embodiment of the present invention.
Figure 10B:
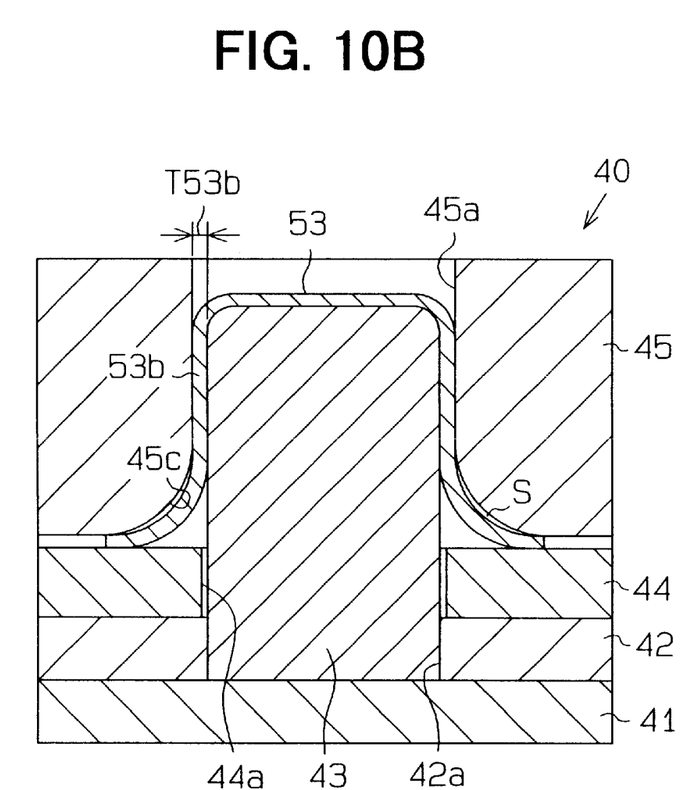
FIG. 10B is another cross sectional view for illustrating the method of manufacturing the yoke in accordance with the second embodiment of the present invention.

As shown in FIGS. 10A and 10B, the second drawing device 40 has a packing plate 41, a punch holder 42, a punch (second punch) 43, a presser plate (second presser plate) 44 and a die (second die) 45.

The packing plate 41 is formed in the shape of a generally circular plate. The punch holder 42 is fixed on the top of the packing plate 41. In addition, an elliptically-shaped central opening 42a is formed in the center of the punch holder 42. A minor axial length of the central opening 42a of the punch holder 42 is shorter than that of the central opening 32a of the punch holder 32 while a major axial length of the central opening 42a is longer than that of the punch holder 32. That is, the central opening 42a is formed in the shape of an ellipse which is closer to a perfect circle than the central opening 32a. In FIG. 10A, furthermore, there is shown a cross section of the central opening 42a of the punch holder 42 taken along a minor axis of the central opening 42a. In FIG. 10B, on the other hand, there is shown a cross section of the central opening 42a of the punch holder 42 taken along a major axis of the central opening 42a. The punch 43 is formed like a bar in the shape of an ellipse in its radial cross section corresponding to the shape of the opening 42a. The punch 43 is introduced into the central opening 42a of the punch holder 42 until the bottom end of the punch 43 touches the top surface of the packing plate 41. It is noted that the punch 43 of the second drawing device 40 is formed so as to be longer than the punch 33 of the first drawing device 30.

The presser plate 44 is placed above the punch holder 42. In the center of the presser plate 44, an elliptically-shaped central opening 44a is formed such that it is slightly larger than the central opening 42a of the punch holder 42.

The die 45 is arranged above the presser plate 44. The die 45 is generally formed in the shape of a cylinder. A central opening 45a of the die 45 is formed in the shape of an ellipse in its radial cross section and is larger than the central opening 42a of the punch holder 42a for a predetermined amount. In other words, such a configuration of the central opening 45a of the die 45 allows insertion of the punch 43 in such a manner that a predetermined clearance is formed between the die 45 and the punch 43. In addition, there are first and second curved surface portions 45b and 45c formed on a bottom end of the central opening 45a of the die 45 (an inner peripheral edge on the bottom of the die 45). The curved surface portions 45b and 45c are gradually extended toward the bottom end. In addition, a curvature of each second curved portion 45c (FIG. 10B) located along a major axis of the central opening 45a is made smaller than that of each first curved portion 45b (FIG. 10A) located along a minor axis of the central opening 45a.

Furthermore, the packing plate 41, the punch holder 42 and the punch 43 are assembled together. Then, such an assembly and the die 45 are arranged so as to allow their relative displacements with respect to the presser plate 44 in upward and downward directions by means of a driving device (not shown) connected thereto.

Referring now to FIG. 7A to FIG. 10B, a method of manufacturing the yoke 21 will be described. The yoke 21 is fabricated from a disc-shaped metal plate 51 acting as a plate material by performing a multistage-drawing process.

As shown in FIGS. 7A and 7B, at first, an outer periphery of the metal plate 51 is sandwiched or is clamped between the presser plate 34 of the first drawing device 30 (i.e., the protrusions 34b) and the die 35 at the initial drawing stage. In this case, as shown in FIG. 7B, portions of the outer periphery of the metal plate 51, which are located outside of the protrusions 34b, are spaced away from the presser plate 34.

Figure 8A:
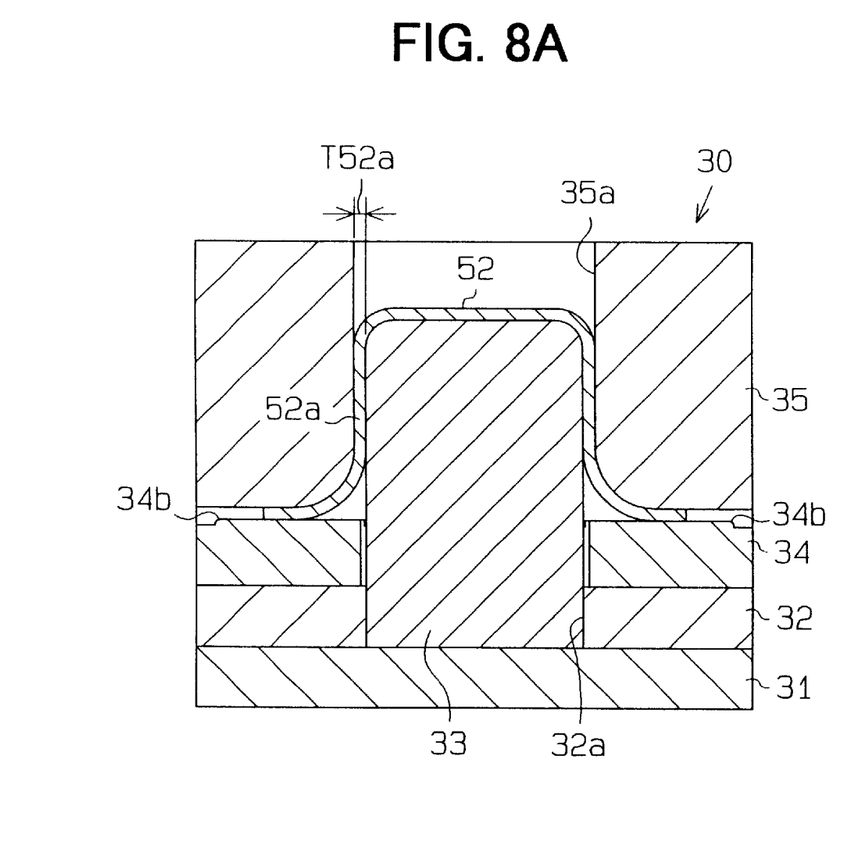
FIG. 8A is a cross sectional view for illustrating a method of manufacturing the yoke according to the second embodiment of the present invention.
Figure 8B:
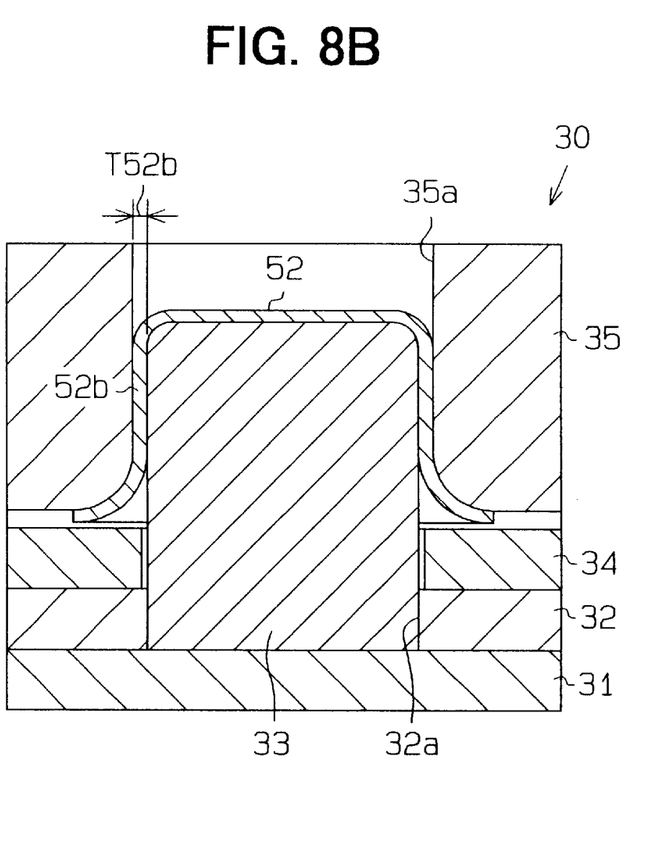
FIG. 8B is another cross sectional view for illustrating the method of manufacturing the yoke according to the second embodiment of the present invention.

As shown in FIGS. 8A and 8B, furthermore, a first-drawing product 52 in the shape of an elliptically cylindrical container is manufactured by inserting the punch 33 into the die 35.

At this time, just as in the case of the first embodiment, since a degree of contraction in a circumferential direction is comparatively small, a thickness $T52a$ of an arc segment 52a with a small amount of curvature of an elliptical shape (hereinafter, simply referred to as a smaller-curvature arc segment 52a) (see FIG. 8A) becomes thinner than a thickness $T52b$ of an arc segment 52b with a large amount of curvature (hereinafter, simply referred to as a larger-curvature arc segment 52b) (see FIG. 8B)

Figure 9:
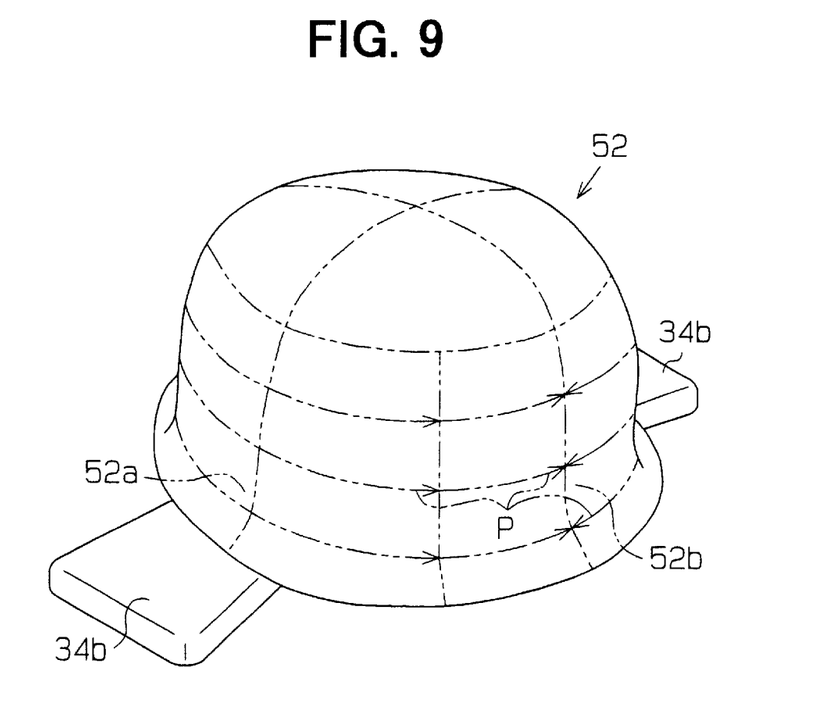
FIG. 9 is a schematic perspective view for illustrating internal stress induced by protrusions.

Furthermore, since the drawing process is performed while the metal plate 51 is clamped between the protrusions 34b, which oppose the corresponding smaller-curvature arc segments 52a, and the die 35, the drawing resistance is larger at each smaller-curvature arc segment 52a while it is low at each larger-curvature arc segment 52b. Therefore, as shown in FIG. 9, an internal stress P is induced in the direction from the smaller-curvature arc segment 52a to the larger-curvature arc segment 52b. As a result, the thickness T52a of the smaller-curvature arc segment 52a becomes largely thinner than the thickness T52b of the larger-curvature arc segment 52b. In the first-drawing product 52, the difference between the thickness T52a of the smaller-curvature arc segment 52a and the thickness T52b of the larger-curvature arc segment 52b increases.

Subsequently, as shown in FIGS. 10A and 10B, the next drawing step allows the manufacture of a re-drawing product 53 by drawing the first-drawing product 52 as an intermediate product by the second drawing device 40.

Here, the elliptical shape of the central opening 45a formed on the die 45 is closer a perfect circle than the central opening 35a of the die 35. Furthermore, the punch 43 is formed so that it is longer than the punch 33 of the first drawing device 30. Therefore, the re-drawing product 53 having a longer depth and a shape of an ellipse cross section closer to the perfect circle than that of the first-drawing product 52 can be obtained.

At this time, the curvature of the second curved portion 45c (FIG. 10B) located along the major axis of the central opening 45a of the die 45 is smaller than that of the first curved portion 45b (FIG. 10A) located along the minor axis of the central opening 45a. Therefore, the drawing resistance at the smaller-curvature arc segment 53a increases while the drawing resistance at the larger-curvature arc segment 53b decreases. This is due the fact that a space S is formed between the die 45 and the segment 53b. As a result, an internal stress is induced just as in the case of the initial drawing stage. Thus, the thickness T53a of the smaller-curvature arc segment 53a becomes thinner than the thickness T53b of the larger-curvature arc segment 53b. In the re-drawing product 53, consequently, the difference between the thickness T53a of the smaller-curvature arc segment 53a and the thickness T53b of the larger-curvature arc segment 53b increases.

Next, at the middle stage of drawing the re-drawing product 53, there is formed a second re-drawing product (not shown) which is generally formed deeper than the re-drawing product and in the shape of a generally perfect circular cylindrical container. In this case, the drawing process is performed in the manner similar to that in the case with the second drawing device 40, where each of curved portions of the die has its own distinct curvature so as to make a large difference between the thicknesses of the different portions of the second re-drawing product (i.e., so as to keep such a difference).

Next, at the late stage of drawing the second re-drawing product, there is formed a third re-drawing product (not shown) which is generally formed in the shape of an elliptically cylindrical container and is formed deeper than or equal to the second re-drawing product. In this case, the relationship between the smaller-curvature arc segment 52a and the larger-curvature arc segment 52b in the first-drawing product 52 is reversed (i.e., the relationship between the major and minor axes is reversed). In this case, similar to that in the case with the second drawing device 40, each of curved portions of the die has its own distinct curvature so as to make a large difference between the thicknesses of the different portions of the second re-drawing product (i.e., so as to keep such a difference).

Next, at the final stage of drawing the third re-drawing product into a final product as a yoke, the yoke 21 is formed so that the smaller-curvature arc segment of the third re-drawing product (that corresponds to the larger-curvature arc segment 52b of the first-drawing product 52) is provided as the flat portion 21a while the larger-curvature segment (that corresponds to the smaller-curvature arc segment 52a of the first-drawing product 52) is provided as the curved portion 21b. Thus, the thickness T21a of the flat portion 21a becomes thicker than the thickness T21b of the curved portion 21b. In the present embodiment, furthermore, the thickness T21a of the flat portion 21a becomes thicker than the thickness of the pre-drawing metal plate 51.

In the present embodiment, although the drawing process is described as one having five stages (i.e., initial, second, middle, late, and final stages), several drawings are actually performed in each step to gradually deform the target product, which does not limit the scope of the present invention.

The advantages of the second embodiment will be described below.

(1) As the degree of contraction in a circumferential direction is small, the thickness 52b of the smaller-curvature arc segment 52a becomes thinner than the thickness T52b of the larger-curvature arc segment 52b when the initial drawing product 52 in the shape of an elliptically cylindrical container is formed at the initial drawing stage. Finally, the smaller-curvature arc segment 52a of the first-drawing product 52 becomes the curved portion 21b, and the larger-curvature segment 11b of the first-drawing product 52 becomes the flat portion 21a, so that the thickness T21a of the flat portion 21a becomes thicker than the thickness T21b of the curved portion 21b.

(2) Furthermore, the initial stage of the drawing process includes the step of sandwiching the metal plate 51 between the die 35 and the protrusions 34b formed to oppose the smaller-curvature arc segment 52a. Therefore, the drawing resistance is larger at the smaller-curvature arc segment 52a, while the drawing resistance is smaller at the larger-curvature arc segment 52b. Consequently, as shown in FIG. 9, an internal stress P is generated in the direction from the smaller-curvature arc segment 52a to the larger-curvature arc segment 52b. Thus, the thickness T52a of the smaller-curvature arc segment 52a becomes extensively thinner than the thickness T52b of the larger-curvature arc segment 52b. As a result, the difference between the thickness T52a and the thickness T52b of the first-drawing product 52b (i.e., the small- and larger-curvature arc segments 52a and 52b) becomes large. Finally, the difference between the thicknesses of the different portions of the yoke 21, i.e., the difference between the thickness T21a of the flat portion 21a and the thickness T21b of the curved portion 21b increases.

(3) Furthermore, at the second stage of the drawing process, the curvature of the second curved portion 45c (see FIG. 10B) that corresponds to the direction of a major axial length of the central opening 45a of the die 45 is smaller than that of the first curved portion 45b (see FIG. 10A) that corresponds to the direction of a minor axial length of the central opening 45a. Thus, the drawing resistance is larger at the smaller-curvature arc segment 53a, and the drawing resistance is smaller at the larger-curvature arc segment 53b. This is due to the fact that a space S is generated between the segment 52b and the die 45 and the like. Therefore, an internal stress is generated similar to that in the case with the initial stage, so that the thickness T53a of the smaller-curvature arc segment 53a becomes thinner than the thickness T53b of the larger-curvature arc segment 53b. As a result, the difference between the thickness T53a and the thickness T53b of the re-drawing product 53 (i.e., the small- and larger-curvature arc segments 53a and 53b) becomes large. Finally, the difference between the thicknesses of the different portions of the yoke 21, i.e., the difference between the thickness T21a of the flat portion 21a and the thickness T21b of the curved portion 21b increases.

(4) Consequently, the thickness T21a of the flat portion 21a, which is much influential on the magnetic circuit, becomes thicker than that of the thickness T1a in the first embodiment, so that its magnetic reluctance decreases further. Thus, it contributes to a high torque performance of the electric motor. Furthermore, the thickness T21b of the curved portion 21b, which can be comparatively thin because of its small influence on a magnetic circuit (the magnetic reluctance may be large), becomes smaller than the thickness T1b in the first embodiment, so that the amount of wasted part of the material can be decreased. Therefore, the yoke 21 can be produced at a low cost and can be reduced in weight. As a result, the electric motor having the yoke 21 can be also produced at a low cost, and it allows the reduction in weight and obtains a high torque performance.

(5) As shown in FIG. 7C, the protrusions 34b are arranged in symmetric with respect to the center point of the presser plate 34. Therefore, the thickness of the first-drawing product 52 can be generally equal to each other at every 180 degree interval. Also, the thickness of the final product, yoke 21 can be generally equal to each other at every 180 degree interval. Therefore, a good revolving properties of the electric motor can be attained.

Each of the above embodiments may be modified and performed as follows.

At the initial stage of the drawing process in the first embodiment, the drawing is performed so that the major axial length D1 of the first-drawing product 11 significantly decreases, and the minor axial length d1 of the first-drawing product 11 slightly decreases. Alternatively, the drawing may be performed so that the major axial length D1 of the first-drawing product 11 significantly decreases while the minor axial length d1 of the first-drawing product 11 is not changed. In this case, the same advantages as those of the first embodiment can be obtained.

At the middle stage of the drawing process in the first embodiment, the drawing is performed so that the major axial length D1 of the first-drawing product 11 significantly decreases, and the minor axial length d1 of the first-drawing product 11 slightly decreases. Alternatively, the drawing may be performed so that the major axial length D1 of the first-drawing product 11 decreases while the minor axial length d1 of the first-drawing product 11 increases. In this case, the advantage similar to the advantage (1) of the first embodiment can be obtained.

At the late stage of the drawing process in the first embodiment, the drawing is performed so that the major axial length D1 of the first-drawing product 11 significantly decreases and the minor axial length d1 of the first-drawing product 11 slightly decreases. Alternatively, the drawing may be performed so that the major axial length D1 of the first-drawing product 11 significantly decreases while the minor axial length d1 of the first-drawing product 11 is not changed. In this case, the same effects as those of the first embodiment can be obtained.

At the late stage of the drawing process in the first embodiment, the drawing is performed so that the major axial length D1 of the first-drawing product 11 significantly decreases furthermore and the minor axial length d1 of the first-drawing product 11 slightly decreases. Alternatively, the drawing may be performed so that the major axial length D1 of the first-drawing product 11 decreases while the minor axial length d1 of the first-drawing product 11 increases. In this case, the same effect as the effect (1) of the first embodiment can be obtained.

Figure 11:
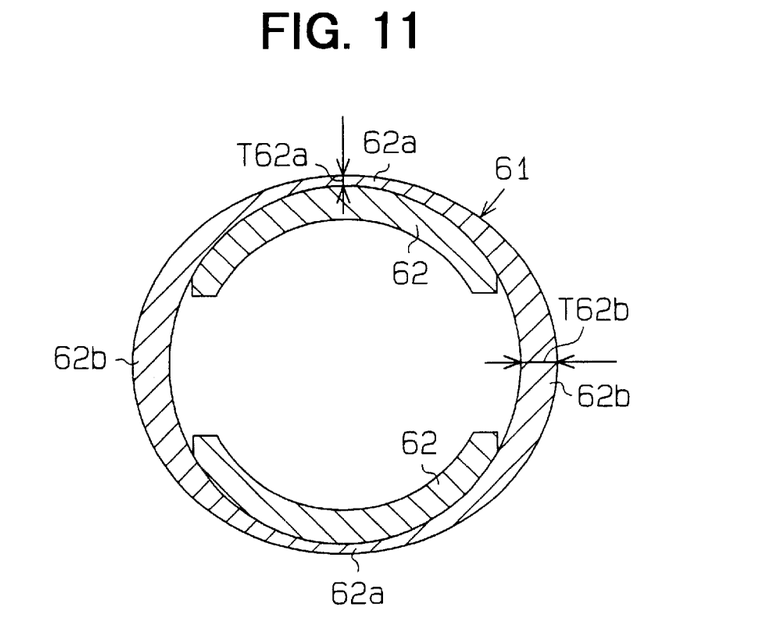
FIG. 11 is a cross sectional view showing a modification of the yoke.

In the second embodiment, the yoke 21 in the shape of a flat cylindrical container (FIG. 6B) is fabricated. Alternatively, as shown in FIG. 11, a yoke 61 may be fabricated by the process in which the final step is modified so as to be almost the same as that of the middle stage in the second embodiment to provide the yoke 61 having an inner periphery in the shape of a generally perfect circle and an outer periphery in the shape of a generally ellipse. In this case, on account of the same reasons as those of the advantages (1) to (3) in the second embodiment, the thickness T62a of the magnet-fixing portion 62a on which the magnet 62 is fixed can be decreased, while the thickness T62b of the magnet-free portion 62b where the magnet 62 is not fixed on can be increased. As a result, the advantage similar to the advantage (4) of the second embodiment can be attained.

Further alternatively, the final step of manufacturing the yoke 61 shown in FIG. 11 can be modified to provide the yoke having an inner periphery in the shape of a generally ellipse and an outer periphery in the shape of a generally perfect circle. In this case, the advantages, similar to those described with reference to FIG. 11 can be achieved.

At the second stage of the drawing process in the second process, the curvature of the second curved portion 45c (see FIG. 10B) that corresponds to the direction of a major axial length of the central opening 45a formed on the die 45 is smaller than that of the first curved portion 45b (see FIG. 10A) that corresponds to the direction of a minor axial length of the central opening 45a. However, these curvatures of the first and second curved portions may be equal to each other. In this case, the advantages similar to the advantages (1), (2), (4), and (5) of the second embodiment can be attained. Furthermore, in at least one of the stages of the multistage-drawing process, the first and second curved portions at the initial stage of the drawing process may be arranged as follows. That is, the curvature of the second curved portion as an inter peripheral edge of the die at a position that corresponds to a major axial length of the elliptical shape at the initial stage may be smaller than that of the first curved portion as an inter peripheral edge of the die at a position that corresponds to a minor axial length of the elliptical shape in the initial stage. In this case, the drawing process can be performed so as to make a larger difference between the thicknesses of the drawing product at a stage in which the curvatures of the die are different from each other or to keep the difference therebetween.

In the above second embodiment, at the initial stage of the drawing process, the drawing is performed by sandwiching the metal plate 51 between the protrusions 34b and the die 35, wherein each protrusion 34b is provided on the presser plate 34 at a position that corresponds to the corresponding smaller-curvature arc segment 52a. Alternatively, the presser plate without any protrusion 34b may be used in such a drawing procedure. In this case, the advantages similar to the advantages (1), (3), and (4) in the second embodiment can be attained. Furthermore, the drawing may be performed at the initial stage in the other example described above (FIG. 11B) such that the metal plate 51 is sandwiched between the presser plate on which the protrusion 34b is not formed and the die 35.

In the above second embodiment, the protrusions 34b are formed on the presser plate 34. Alternatively, an additional protrusion may be formed on at least one of the presser plate 34 and the die 35 to oppose the metal plate, as long as a large drawing resistance is obtained on the smaller-curvature arc segment 52a, and a small drawing resistance is obtained on the larger-curvature arc segment 52b. In this case, the advantages similar to the advantages in the second embodiment can be obtained.

In the above second embodiment, the protrusions 34b are arranged as a fan form. Alternatively, the protrusions 34b may be arranged as another form, as long as a large drawing resistance is obtained on the smaller-curvature arc segment 52a while a small drawing resistance is obtained on the larger-curvature arc segment 52b. In this case, the advantages similar to the advantages in the second embodiment can be also attained.

In the above description, the elliptical shape may simply include an elongated circle in addition to an oval figure or an ellipse. The major axial length described above denotes the length measured along the longer of two axis of symmetry of the oval figure. On the other hand, the minor axial length described above denotes the length measured along the shorter of two axis of symmetry of the oval figure.

Additional advantages and modifications will readily occur to those skilled in the art. The invention in its broader terms is therefore, not limited to the specific details, representative apparatus, and illustrative examples shown and described.

What is claimed is:

1. A method of manufacturing a yoke by drawing a plate material into a final product as the yoke by performing a multistage-drawing process, where the final product as the yoke is in the shape of a cylindrical container having a couple of thick wall portions opposed to each other in a cross section perpendicular to a central axis of the final product and a couple of thin wall portions that are thinner than the thick wall portions and connect the thick wall portions together, wherein a distance between the thick wall portions is shorter than a distance between the thin wall portions, the method comprising steps of:

drawing the plate material into a first-drawing product in the shape of an elliptically cylindrical container at an initial drawing stage, the first-drawing product including an elliptical cross section having a major axial length measured along a major axis of the elliptical cross section and a minor axial length measured along a minor axis of the elliptical cross section;

drawing the first-drawing product obtained at the initial drawing stage into a re-drawing product in the shape of a generally circular cylindrical container at a middle drawing stage;

drawing the re-drawing product obtained at the middle drawing stage into a late-drawing product in the shape of an elliptically cylindrical container at a late drawing stage, the late-drawing product including an elliptical cross section having a major axial length measured along a major axis of the elliptical cross section and a minor axial length measured along a minor axis of the elliptical cross section, the major axis and the minor axis of the elliptical cross section of the late drawing product obtained at the late drawing stage being reversed with respect to the major axis and the minor axis of the elliptical cross section of the first-drawing product obtained at the initial drawing stage, the late-drawing product having a couple of opposed smaller-curvature arc segments of a smaller curvature and a couple of opposed larger-curvature arc segments of a larger curvature; and drawing the late-drawing product obtained at the late drawing stage into the final product as the yoke at a final stage, such that the smaller-curvature arc segments of the late-drawing product are converted to the flat thick wall portions of the final product, respectively, and the larger-curvature arc segments of the late-drawing product are converted to the thin wall portions of the final product, respectively.

2. A method according to claim 1, wherein the re-drawing product obtained at the middle drawing stage is formed in the shape of the generally circular cylindrical container at the middle drawing stage by substantially reducing the major axial length of the first-drawing product obtained at the initial drawing stage while slightly reducing or maintaining the minor axial length of the first-drawing product.

3. A method according to claim 1, wherein the late-drawing product in the shape of the elliptically cylindrical container is obtained at the late drawing stage by substantially reducing the major axial length of the first-drawing product obtained at the initial drawing stage to get the minor axial length of the late-drawing product while slightly reducing or maintaining the minor axial length of the first-drawing product to get the major axial length of the late-drawing product.

4. A method according to claim 1, wherein:

the thick portions of the final product are generally flat; and the thin portions of the final product are curved.

5. A method of manufacturing a yoke, which includes two opposing thick wall portions and two opposing thin wall portions, wherein the thin wall portions connect the thick wall portions together, and a distance between the thick wall portions is shorter than a distance between the thin wall portions, the method comprising:

drawing a plate material into a first-drawing product, which has an elliptical cross section, wherein the first-drawing product includes:

two thick wall portions, which at least partially correspond to the thick wall portions of the yoke and are opposed with each other in a direction of a major axis in the elliptical cross section of the first-drawing product; and two thin wall portions, which at least partially correspond to the thin wall portions of the yoke and are opposed with each other in a direction of a minor axis in the elliptical cross section of the first-drawing product, wherein the thin wall portions of the first-drawing product are thinner than the thick wall portions of the first-drawing product; and drawing the first-drawing product into a late-drawing product, which has an elliptical cross section, in such a manner that the thin wall portions of the first-drawing product are opposed in a direction of a major axis of the elliptical cross section of the late-drawing product, wherein the direction of the major axis of the elliptical cross section of the late-drawing product is perpendicular to the direction of the major axis of the elliptical cross section of the first-drawing product.

6. A method according to claim 5, wherein the drawing of the first-drawing product into the late-drawing product includes:

drawing the first-drawing product into a re-drawing product which has a generally circular cross section; and drawing the re-drawing product into the late-drawing product.

7. A method according to claim 5, further comprising drawing the late-drawing product into a final drawing product in a form of the yoke.

8. A method according to claim 5, wherein:

the thick portions of the yoke are generally flat; and the thin portions of the yoke are curved.

* * * * *